(12) United States Patent
Wouters

(10) Patent No.: US 8,834,037 B2
(45) Date of Patent: Sep. 16, 2014

(54) HERMAPHRODITIC CONNECTOR WITH MULTI-FIBER TERMINI

(71) Applicant: Vincent A. Wouters, McKinney, TX (US)

(72) Inventor: Vincent A. Wouters, McKinney, TX (US)

(73) Assignee: Optical Cable Corporation, Roanoke, VA (US)

( * ) Notice: Subject to any disclaimer, the term of this patent is extended or adjusted under 35 U.S.C. 154(b) by 0 days.

(21) Appl. No.: 13/791,895

(22) Filed: Mar. 8, 2013

(65) Prior Publication Data

US 2013/0236140 A1    Sep. 12, 2013

Related U.S. Application Data

(60) Provisional application No. 61/608,153, filed on Mar. 8, 2012.

(51) Int. Cl.
*G02B 6/38* (2006.01)

(52) U.S. Cl.
CPC ..................... *G02B 6/383* (2013.01)
USPC .............................. 385/71; 385/72

(58) Field of Classification Search
CPC ....................................... G02B 6/383
USPC ...................................... 385/71, 72
See application file for complete search history.

(56) References Cited

U.S. PATENT DOCUMENTS

| 6,030,244 | A  | * | 2/2000  | Buckheit et al. | 439/291 |
| 6,234,683 | B1 | * | 5/2001  | Waldron et al.  | 385/78  |
| 6,305,849 | B1 | * | 10/2001 | Roehrs et al.   | 385/59  |
| 6,848,834 | B1 | * | 2/2005  | Roehrs et al.   | 385/59  |
| 7,441,962 | B2 | * | 10/2008 | Penumatcha et al. | 385/71 |
| 7,476,035 | B2 | * | 1/2009  | Cull et al.     | 385/60  |
| 7,572,063 | B2 | * | 8/2009  | Mynott et al.   | 385/56  |
| 7,585,116 | B2 | * | 9/2009  | Cull et al.     | 385/60  |

* cited by examiner

*Primary Examiner* — Omar Rojas
(74) *Attorney, Agent, or Firm* — David M. Carter; The Van Winkle Law Firm

(57) ABSTRACT

A hermaphroditic connector assembly for fiber optic cables includes a base portion defining at least one passage for receiving at least one optical fiber. The connector further includes an insert cap that selectively connects to and disconnects from the base portion to receive the optical fiber. The insert cap defines a first face and a tower extending substantially perpendicularly adjacent the first face. The tower defines a cavity therein. A first ferrule is supported by and extends through the first face of the insert cap. A second ferrule is supported by and extends through the tower, and the second ferrule is within the cavity defined by the tower. The first and second ferrules define sets of socket and pin termini within the hermaphroditic connector assembly. An electrical pin terminus extends through the first face, and an electrical socket terminus extends into the tower.

18 Claims, 4 Drawing Sheets

HERMAPHRODITIC CONNECTOR WITH MULTI-FIBER TERMINI

CROSS-REFERENCE TO RELATED APPLICATIONS

This application claims priority to and incorporates entirely by reference U.S. Provisional Patent Application Ser. No. 61/608,153 filed on Mar. 8, 2012.

FIELD OF THE INVENTION

This application relates to the field of connectors for optical fibers.

BACKGROUND

Fiber optic cables transmit signals along bundled optical fibers using light signals to relay information at extraordinary speeds with little attenuation. Fiber optic cables span long distances, of course, and must be connected to repeaters for transmission quality. The cables also connect to peripheral networking equipment and to other fiber optic cables for proper communication signal transmission.

The art of fiber optic communications is replete with different kinds of fiber optic cable connectors for numerous environments and specialized applications. Connector systems are already designed to resist extreme harsh mechanical and environmental conditions, including high vibration, mechanical and thermal shock, and fluid immersion. Also, these cables must continue to operate under extreme tension loading. It continues to be imperative, however, for new fiber optic connector designs to maintain the integrity of the optical fibers being connected and to minimize damage in every way possible.

With so many different kinds of connectors available to system installation professionals, it is difficult to ensure that a proper fiber optic cable intersects the appropriate mate with a convenient connector that also protects the underlying fibers. Installers may damage equipment or significantly delay system operation by improperly mating optical fibers that are not intended to intersect or by installing fiber optical cables with connectors that provide insufficient protection.

A problem exists in the field of fiber optic connectors in that the connectors remain limited in versatility and are not designed with sufficient weatherproof and hazard-proof bodies to protect the fiber optics therein.

BRIEF SUMMARY OF THE INVENTION

In a first embodiment, a connector for optical fibers has a base portion through which optical fibers enter the connector and further includes an insert cap that selectively connects and disconnects to and from the base portion to receive optical fibers. The insert cap has a first face and a tower extending adjacent the first face. The tower defines a cavity. A first ferrule is supported by and extends through the first face of the insert cap. A second ferrule is supported by and extends through the tower. The second ferrule is within the cavity defined by the tower.

In another embodiment, a connector for optical fibers includes a base portion defining at least one passage for receiving optical fibers there through and an insert cap releasably connected to said base portion and receiving the optical fibers, wherein the insert cap has a first face and a tower extending from the first face. The tower defines a cavity therein. A first ferrule is supported by and extends through the first face of the insert cap. A second ferrule is supported by and extends through the tower, and the second ferrule is within the cavity defined by the tower.

In yet another embodiment, a hermaphroditic connector assembly for fiber optic cables includes a base portion defining at least one passage for receiving at least one optical fiber there through. The connector further includes an insert cap that selectively connects to the base portion to receive the optical fiber. The insert cap defines a first face and a tower extending substantially perpendicularly adjacent the first face. The tower defines a cavity therein. A first ferrule is supported by and extends through the first face of the insert cap. A second ferrule is supported by and extends through the tower, and the second ferrule is within the cavity defined by the tower. The first and second ferrules define sets of socket and pin termini within the hermaphroditic connector assembly.

DETAILED DESCRIPTION

Figure 4:
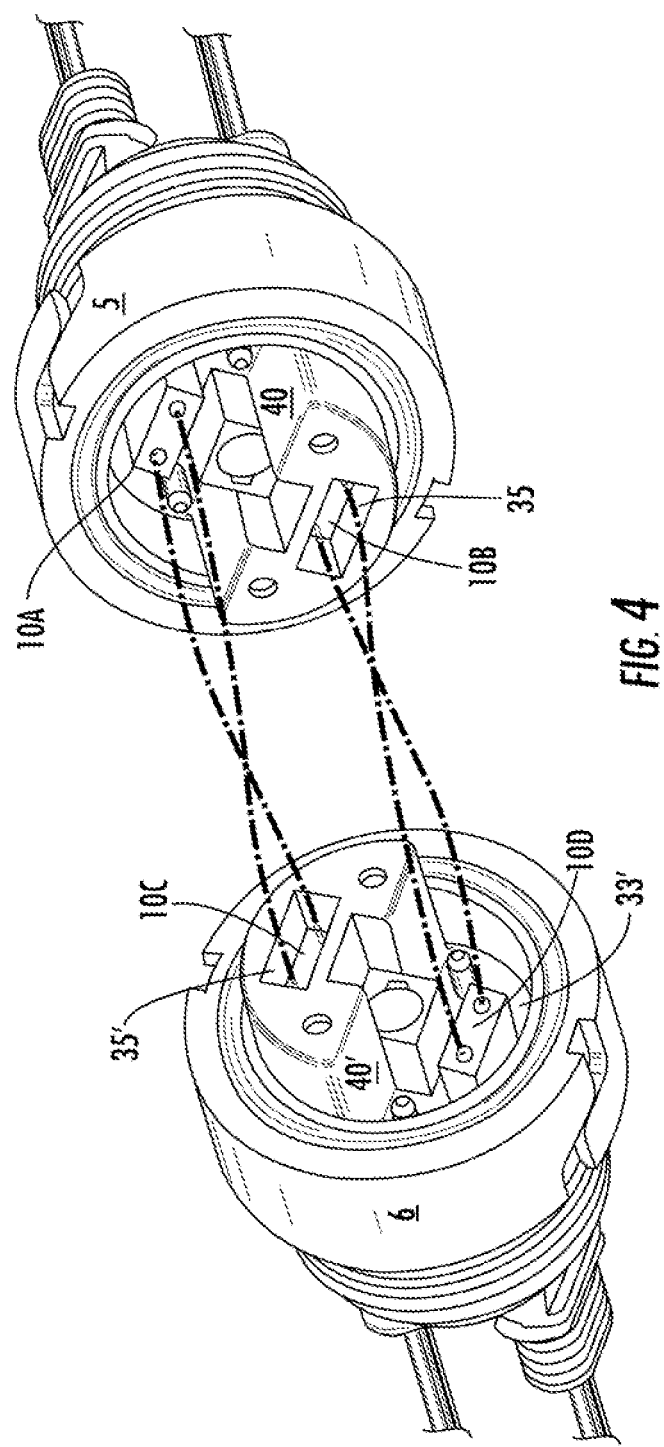
FIG. 4 is a perspective view of mating hermaphroditic fiber optic connectors as disclosed here.

A connector (5) fitted with a terminus (termini) (15A, 158, 18A, 18B) having multi-channel ferrule(s) (10A, 10B) suitable for connecting in an aligned optically coupled manner to a similar connector (FIG. 4, Ref. 6) having mating multi-channel ferrule(s) (10C, 10D). The mating end faces of the ferrules are mounted such that, when coupled to another connector, lie on an imaginary mating plane. The connector (5) is hermaphroditic in that both the first (5) and the mating (6) connector have substantially the same interface geometry. The connector design is such that there are a number of pairs of termini (15A, 15B) and (18A, 18B) which have half of the termini with protruding alignment pins (18A, 18B) and half with sockets (15A, 15B). Although the mating faces of the ferrules are on a common plane, the connector geometry is divided into two areas. The termini with the alignment pin feature are enclosed in a protruding tower-like structure (40) (referred to herein as a "tower"), whereas an equal number of termini not having the alignment pin feature (i.e., sockets (15A, 15B) protrude from a floor plane, or face (33), designed to accept engagement of the tower-like structure (40) of the mating connector (FIG. 4, Ref. 6). The multi-fiber termini ferrules (10A, 10B, 10C, 10D) are independently gimbaled with gimbal points being disposed distally from respective mating plane between opposing terminal ends of the termini. Matched pairs of electrical pins (25A, 25B) and sockets (30A, 30B) can also be located in connector features having the sockets located in the tower-like structure (40), and the pins extending from the floor of the connector. In regard to the connector (5) shown herein, the connector includes multi-fiber termini ferrules in a sealed hermaphroditic connector. The ferrules are free floating within the assembly to maintain proper alignment when subject to outside forces. Significantly, when two hermaphroditic connectors (5, 6) are mated as shown in FIG. 4, the result is that the optical fibers connect for signal transmission within the tower-like structures (40, 40') so that the fiber is protected by ferrules encased in a sealed engagement of two insert caps.

In regard to the discussion below, this disclosure refers to the tower-like structure (40) as the "tower" but such designation is not intended to limit the invention in any way. Instead, the use of the word tower is a descriptive term to denote the fact that the ferrules (10A, 10B) are attached within the connector (5) on distinct attachment planes. The connector (5) incorporates a detachable insert cap (110) that has a lower, first face (33) and an adjacent elevated section referred to as the tower (40). In general, the connector has a first end (7) and a second end (8). An edge of the tower (40) defines the first end (7) and a different edge on a threaded housing (45) defines the second end (8). The first face lies between the first and second ends (7, 8).

This disclosure illustrates the position of socket and pin connectors as shown in the attached figures, but these arrangements are for example only. The use of sockets or pins on any given ferrule may be changed for the use at hand and should not be interpreted as limiting the invention herein.

Figure 1:
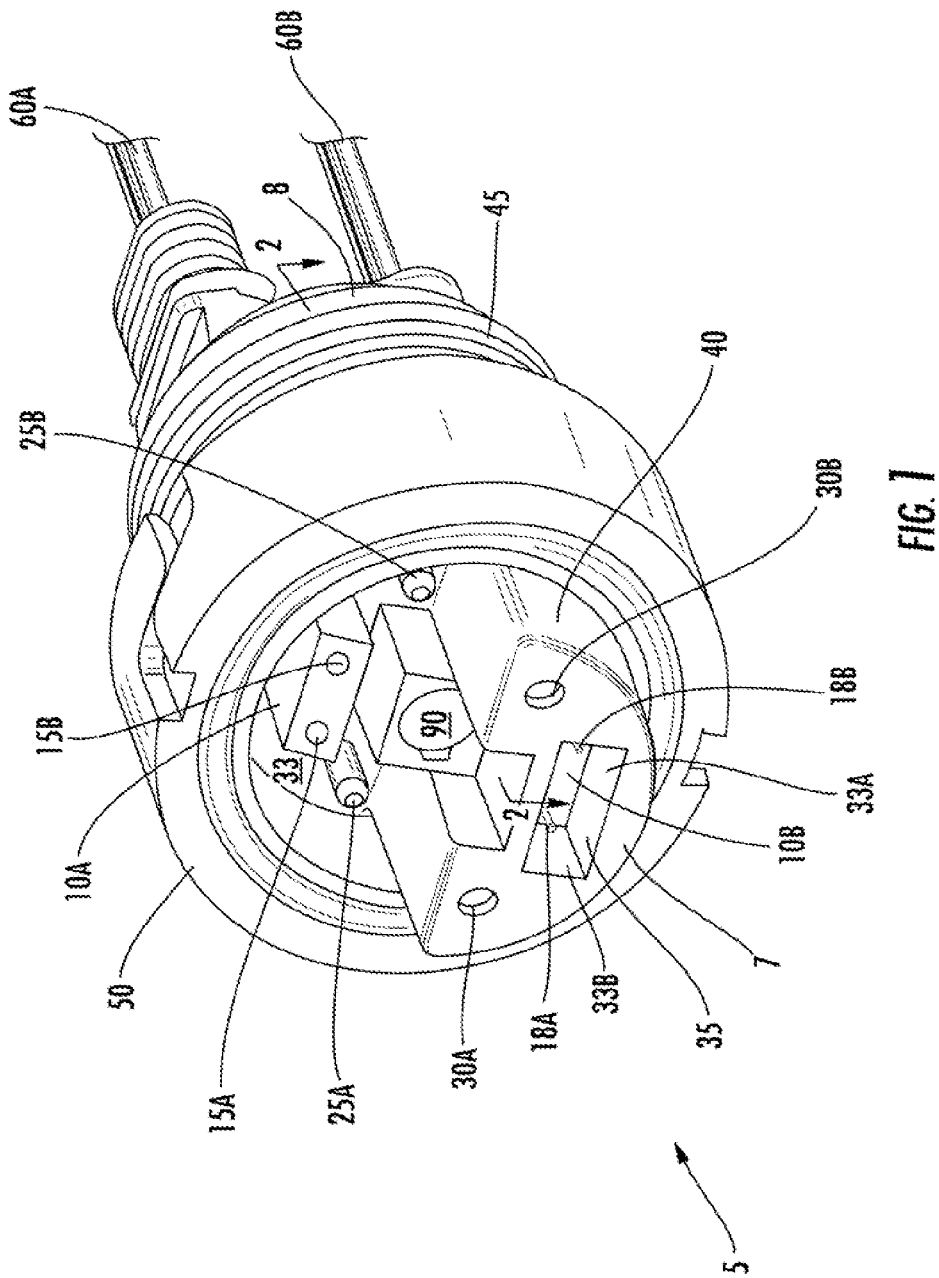
FIG. 1 is a front perspective view of a hermaphroditic fiber optic connector as disclosed herein.

As shown in FIG. 1, a connector (5) for optical fibers (60A, 60B) has two portions within a threaded housing (45) that mates with a threaded shell (50). The two portions within the overall connector (5) are a base portion (FIG. 2, Ref. 117) (through which optical fibers (60A, 60B) enter the connector (5) at the second end (8)) and an insert cap (110) through which the optical fibers (60A, 60B) terminate at appropriate termini (15A, 15B, 18A, 188). The connector (5) is characterized in part by its hermaphroditic assembly that includes both pins (18A, 18B) and sockets (15A, 15B) for connecting with mating hermaphroditic connectors (FIG. 4, Ref. 6) in a given installation. The connector (5) includes a protective cavity (35) in which respective ferrules (10) ultimately mate as shown in FIG. 4. Once mated, the connected ferrules (10A with 10C and 10B with 10D) are securely housed inside the surrounding walls of the cavities (FIG. 6, Refs. 35, 35') which increases the protection afforded to the optical fibers (60A, 60B).

The connector (5) is assembled with the base portion (117) fastened to the insert cap (110) by a fastener such as a screw. In other words, the insert cap (110) selectively connects to and disconnects from the base portion (117) before the outer threaded housing (45) and connector shell (50) encompass the assembly. The connector (5) is designed to receive and protect optical fibers (60A, 60B) extending through the base portion (117) and on to the insert cap (110). The insert cap (110) has a first face (33) and, as described above, a tower (40) extending adjacent the first face (33). The tower defines a cavity (35) within internal walls (33A, 33B, 33C, 33D) extending and connected within the tower (50).

The fiber optic transmission path is determined by optical fibers extending through the connector (5) and terminating at appropriate termination points, or termini (15A, 15B, 18A, 18B). These termination points in a hermaphroditic connector such as the assembly (5) include both sockets (15A, 15B) and pins (18A, 18B) for mating with corresponding pins and sockets in a mating hermaphroditic connector (6) as shown in FIG. 4. The first ferrule (10A), shown for example as having sockets (15A, 15B) is supported by and extends through the first face (33) of the insert cap (110). The second ferrule (10B) is supported by and extends through the tower (40). The second ferrule (10B) is encompassed by and positioned within the cavity (35) defined by the tower (40).

Within the connector (5), the base portion (117) and the insert cap (110) define respective fastener passages (95, 96) that are aligned to receive a fastener 100) there through. In this way, the base portion (117) and the insert cap (110) are separate pieces that are manufactured as distinct components but assembled to form the connector (5). The fastener (100) selectively connects the base portion (117) and the insert cap (110) but can be disconnected if necessary by removing the fastener (100).

In one embodiment the connector (5) utilizes an insert cap (110) that includes a fastener receiver (90) securing the fastener (100) to the connector (5). The fastener (100) and the fastener receiver (90) may be threaded to attach to each other. By incorporating a fastener receiver into the insert cap (110) the design of the connector (5) accommodates manufacturing the base portion (117) and the insert cap (110) out of polymers such as various plastics. These polymers are not conducive to retaining a threaded fastener (100) such as a screw that holds the base portion (117) to the insert cap (110). Accordingly, one embodiment of the connector (5) includes respective passages (95, 96) extending through the base portion (117) and the insert cap (110) for receiving a fastener such as a threaded screw. The screw terminates by mating with a threaded portion of a fastener receiver (90) that is made of appropriate materials such as a metal that is conducive to threading. This arrangement provides a more secure attachment between the insert cap (110) and the base portion (117).

In one non-limiting example of a connector (5), first and second ferrules (10A, 10B) include sets of pins (18A, 18B) and sets of sockets (15A, 15B) such that the connector (5) is a hermaphroditic connector. As noted above, the figures herein show only one example of a respective arrangement of certain pins and certain sockets on particular ferrules. The example of the figures is not limiting of the invention, and other embodiments may include pins and sockets in different combinations of ferrules.

Considering the path of data transmission through the connector of FIG. 1, the base portion (117) of the connector (5) defines at least one fiber passage. FIG. 1 actually indicates an example of a two channel connector having two fib passages (130A, 130B) allowing respective optical fibers (60A, 60B) to extend through the connector (5) to one of said ferrules (10A, 10B). The optical fibers ultimately reach termini (15A, 15B, 18A, 18B) on appropriate ferrules. These ferrules can engage respective mating ferrules to allow the optical fibers to extend across longer distances via mating fiber optic cables. When the ferrules mate as shown in FIG. 4, tight contact between the tips of the optical fibers is important and should be maintained for efficient signal transmission. To ensure that the mated ferrules stay in contact, each ferrule engages a respective spring (70A, 70B) positioned within a respective fiber passage (130A, 130B). Each spring biased to apply pressure, or push, each ferrule toward a mating ferrule.

To provide a finishing protective seal, the connector (5) includes a connector shell (50) enclosing the base portion (117) and the insert cap (110). The connector also has a threaded housing (45) positioned between the connector shell (50) and the combination of the base portion (117) and the insert cap (110). The threaded housing (45) mates with said threaded connector shell (50). The threading on each of the housing (45) and the shell (50) allows for connector to change from a male housing to a female housing for even more flexibility in field installations. As an added element of flexibility for disparate kinds of installations, the connector may include an electrical pin terminus (25A, 25B) that extends through the first face (33) and an electrical socket terminus (30A, 30B) that extends into the tower (40). These electrical interfaces allow for transmission of electrical signals and power in addition to the light signals of the fiber optics.

As shown in FIG. 4, when two connectors (5, 6) as disclosed herein mate in an installation, the optical fibers are protected by sealed engagement of respective ferrules (10A, 10C) or (10B, 10d) sliding within and protected by the walls (33) of a designated cavity (35, 35'). The walls referred to in regard to each connector (5, 6) are located within respective towers (40, 40'). In other words, each mating connector (5, 6) shown in FIG. 4 includes a tower (40, 40') having respective sets of inner walls (33A, 33B, 33C, 33D) and (33A', 33B', 33C', 33D') bounding the respective cavity (35, 35'). The inner walls defining the tower cavities surround at least a portion of certain ferrules (10B, 10D).

Figure 2:
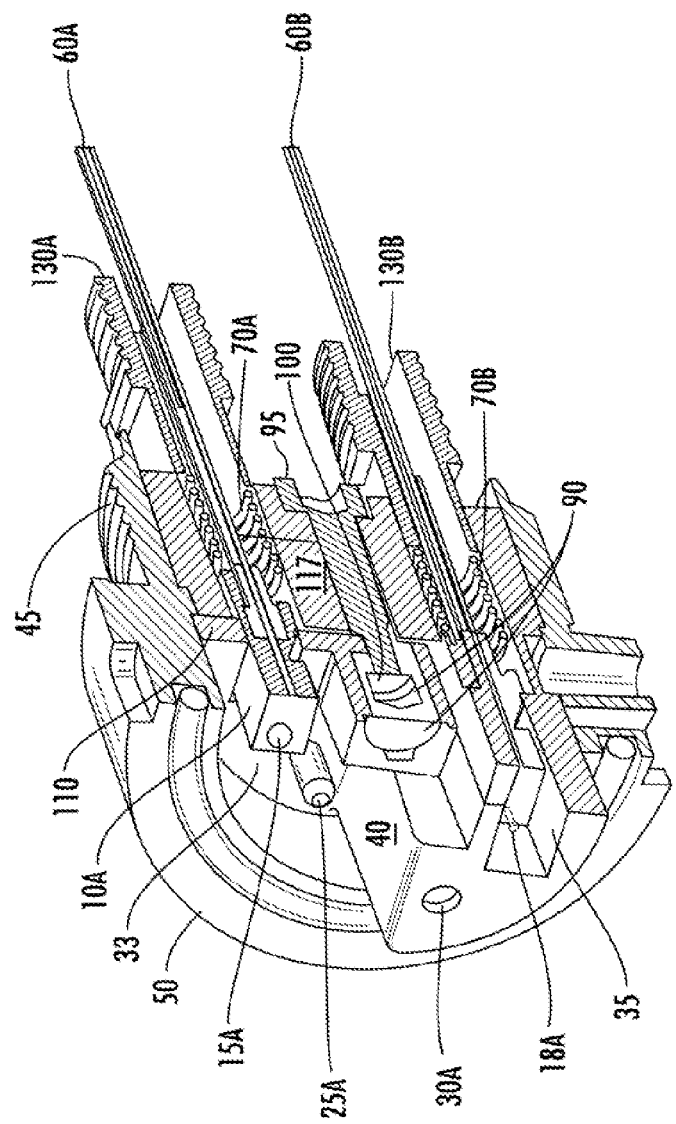
FIG. 2 is a front perspective view of a centered longitudinal cross section 2-2 of the optical fiber connector of FIG. 1.
Figure 3:
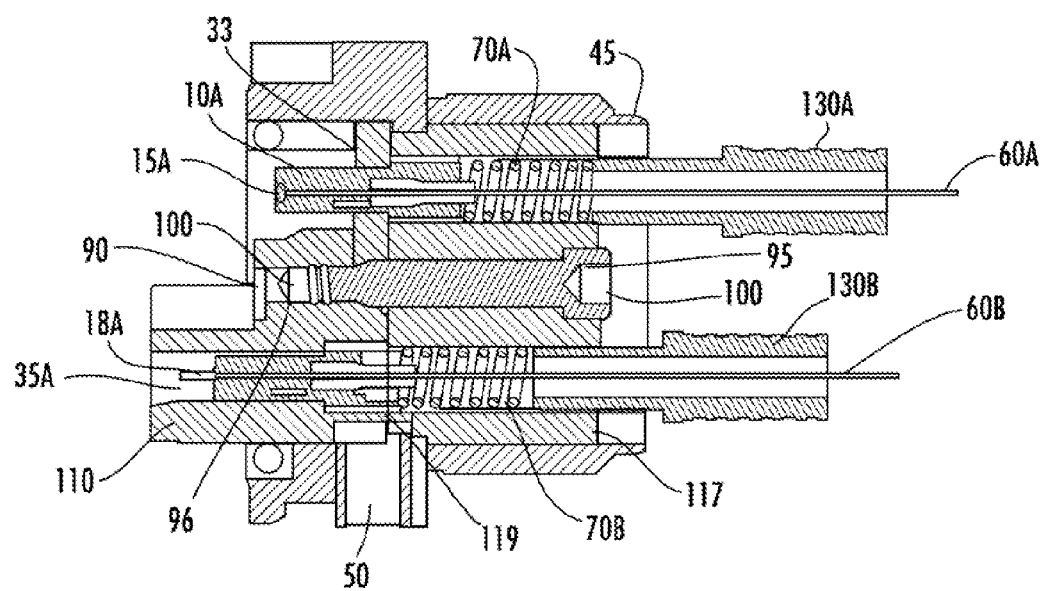
FIG. 3 is a side plan view of a centered longitudinal cross section 2-2 of the optical fiber connector of FIG. 1.

Overall, FIGS. 1-3 illustrate a hermaphroditic connector assembly for fiber optic cables. The assembly (5) includes a base portion (117) defining at least one passage (95A, 95B) for receiving at least one optical fiber (60A, 60B) there through and an insert cap (110) that selectively connects to and disconnects from the base portion (117). The insert cap (110) and the base portion (117) receive the optical fiber (60A, 60B). The insert cap (110) defines a first face (33) and a tower (40) extending substantially perpendicularly adjacent the first face (33). The tower (40) defines a cavity (35). A first ferrule (10A) is supported by and extends through the first face (33) of the insert cap (110), and a second ferrule (106) is supported by and extends through the tower (40), wherein the second ferrule (10B) is within the cavity (35) defined by the tower (40). The first and second ferrules (10A, 106) define sets of socket (30A, 30B) and pin termini (25A, 25B) within the hermaphroditic connector assembly.

The hermaphroditic connector assembly (5) is positioned to receive a mating hermaphroditic connector (6), and the mating hermaphroditic connector (6) includes a second tower (40') defining a second cavity (35') and a second face (33'), wherein the mating hermaphroditic connector (6) comprises a third ferrule (10C) that mates with the first ferrule (10A) of the assembly (5) and a fourth ferrule (100) that mates with the second ferrule (10B) of the assembly. Furthermore, the hermaphroditic connector assembly mates with a different hermaphroditic connector (6) of identical construction such that the second tower (40') of the mating hermaphroditic connector (6) defines a second cavity (35') in which the third ferrule (10C) is positioned and a second face (33') through which the fourth ferrule (100) is positioned. Upon mating, the first and third ferrules (10A, 10C) are at least partially surrounded by the second tower (40') of the mating hermaphroditic connector (6), and the second and fourth ferrules (108, 100) are at least partially surrounded by the tower (40) of the hermaphroditic connector assembly (5).

From the foregoing description of the embodiments of the invention, it will be apparent that many modifications may be made therein. It will be understood that these embodiments of the invention are exemplifications of the invention only and that the invention is not limited thereto. The invention is further set forth in the claims that follow.

The invention claimed is:

1. A connector for optical fibers having a base portion through which optical fibers enter the connector, the connector comprising;
an insert cap that selectively connects to and disconnects from the base portion to receive optical fibers, the insert cap comprising a first face and a tower extending adjacent said first face, wherein said tower defines a cavity;
a first ferrule supported by and extending through said first face of said insert cap;
a second ferrule supported by and extending through said tower, wherein said second ferrule is within the cavity defined by said tower;
the base portion and said insert cap define respective fastener passages that are aligned to receive a fastener there through, said fastener selectively connecting said base portion and said insert cap; and
said insert cap further comprises a fastener receiver securing said fastener to the connector, wherein said fastener and said fastener receiver are threaded to attach to each other.

2. A connector for optical fibers having a base portion through which optical fibers enter the connector, the connector comprising:
an insert cap that selectively connects to and disconnects from the base portion to receive optical fibers, the insert cap comprising a first face and a tower extending adjacent said first face, wherein said tower defines a cavity;
a first ferrule supported by and extending through said first face of said insert cap;
a second ferrule supported by and extending through said tower, wherein said second ferrule is within the cavity defined by said tower; and
said first and second ferrules comprise sets of pins and sets of sockets such that the connector is a hermaphroditic connector.

3. A connector according to claim 2, wherein the base portion and said insert cap define respective fastener passages that are aligned to receive a fastener there through, said fastener selectively connecting said base portion and said insert cap.

4. A connector according to claim 2, wherein the base portion of the connector defines at least one fiber passage allowing an optical fiber to extend through the connector to one of said ferrules.

5. A connector according to claim 4, further comprising a spring positioned within said fiber passage to engage one of said ferrules.

6. A connector according to claim 2, further comprising a connector shell enclosing the base portion and said insert cap.

7. A connector according to claim 6, wherein said connector shell is threaded; said connector her comprising a threaded housing positioned between said threaded connector shell and the combination of the base portion and the insert cap, wherein said threaded housing mates with said threaded connector shell.

8. A connector for optical fibers having a base portion through which optical fibers enter the connector, the connector comprising:
an insert cap that selectively connects to and disconnects from the base portion to receive optical fibers, the insert cap comprising a first face and a tower extending adjacent said first face, wherein said tower defines a cavity;
a first ferrule supported by and extending through said first face of said insert cap;
a second ferrule supported by and extending through said tower, wherein said second ferrule is within the cavity defined by said tower; and
an electrical pin terminus extends through said first face and an electrical socket terminus extends into said tower.

9. A connector according to claim 8, further including electrical conductor termini.

10. A connector for optical fibers comprising:
a base portion defining at least one passage for receiving optical fibers there through;
an insert cap releasably connected to said base portion and receiving the optical fibers, wherein said insert cap comprises a first face and a tower extending from said first face, said tower defining a cavity;
a first ferrule supported by and extending through said first face of said insert cap; and a second ferrule supported by and extending through said tower, wherein said second ferrule is within the cavity defined by said tower; and one of said ferrules comprises a set of pin termini and an other of said ferrules comprises a set of socket termini such that the connector is a hermaphroditic connector.

11. A connector for optical fibers comprising:

a base portion defining at least one passage for receiving optical fibers there through;

an insert cap releasably connected to said base portion and receiving the optical fibers, wherein said insert cap comprises a first face and a tower extending from said first face, said tower defining a cavity;

a first ferrule supported by and extending through said first face of said insert cap; and a second ferrule supported by and extending through said tower, wherein said second ferrule is within the cavity defined by said tower; and said tower comprises a set of inner walls bounding the cavity, wherein said inner walls surround at least a portion of said second ferrule.

12. A connector according to claim 11, wherein an electrical pin terminus extends through said first face and an electrical socket terminus extends into said tower.

13. A hermaphroditic connector assembly for fiber optic cables comprising:

a base portion defining at least one passage for receiving at least one optical fiber there through;

an insert cap that selectively connects to and disconnects from the base portion to receive the optical fiber, the insert cap defining a first face and a tower extending substantially perpendicularly adjacent said first face, wherein said tower defines a cavity;

a first ferrule supported by and extending through said first face of said insert cap; and a second ferrule supported by and extending through said tower, wherein said second ferrule is within the cavity defined by said tower;

wherein said first and second ferrules define sets of socket and pin termini within the hermaphroditic connector assembly.

14. A hermaphroditic connector assembly according to claim 13, positioned to receive a mating hermaphroditic connector, said mating hermaphroditic connector comprising a second tower defining a second cavity and a second face, wherein said mating hermaphroditic connector comprises a third ferrule that mates with said first ferrule of the assembly and a fourth ferrule that mates with the second ferrule of the assembly.

15. A hermaphroditic connector assembly of claim 14, wherein the second tower of the mating hermaphroditic connector defines a second cavity in which the third ferrule is positioned and a second face through, which the fourth ferrule is positioned, and wherein upon mating, the first and third ferrules are at least partially surrounded by the second tower of the mating hermaphroditic connector and the second and fourth ferrules are at least partially surrounded by the tower of the hermaphroditic connector assembly.

16. A hermaphroditic connector assembly of claim 13, wherein said base portion and said insert cap define respective fastener passages that are aligned to receive a fastener there through, said fastener selectively connecting said base portion and said insert cap.

17. A hermaphroditic connector assembly according to claim 16, wherein said insert cap further comprises a fastener receiver securing said fastener to the hermaphroditic connector assembly, wherein said fastener and said fastener receiver are threaded to attach to each other.

18. A connector according to claim 13, wherein an electrical pin terminus extends through said first face and an electrical socket terminus extends into said tower.

* * * * *